United States Patent
Kunatharaju et al.

(10) Patent No.: US 12,244,179 B1
(45) Date of Patent: Mar. 4, 2025

(54) ALTERNATE STATOR SLOTS USING COMMON MANIFOLD INTERFACE FOR BIDIRECTIONAL STATOR COOLING

(71) Applicant: Rivian IP Holdings, LLC, Irvine, CA (US)

(72) Inventors: Venkata Harish Kumar Kunatharaju, Irvine, CA (US); Logan Noel Balliett, Los Angeles, CA (US); Dang Dinh Dang, Garden Grove, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/616,861

(22) Filed: Mar. 26, 2024

(51) Int. Cl.
H02K 1/20 (2006.01)
H02K 21/14 (2006.01)

(52) U.S. Cl.
CPC ............... *H02K 1/20* (2013.01); *H02K 21/14* (2013.01)

(58) Field of Classification Search
CPC .................................. H02K 1/20; H02K 21/14
See application file for complete search history.

(56) References Cited

U.S. PATENT DOCUMENTS

| | | |
|---|---|---|
| 2007/0176499 A1 | 8/2007 | Holmes |
| 2010/0277016 A1* | 11/2010 | Dang .................. H02K 1/20 310/54 |
| 2012/0107663 A1 | 5/2012 | Burgers |
| 2014/0265662 A1* | 9/2014 | Shoykhet .............. H02K 1/20 310/59 |
| 2014/0265666 A1* | 9/2014 | Shoykhet .............. H02K 9/197 310/59 |
| 2016/0204486 A1 | 7/2016 | Kenney |
| 2017/0244143 A1 | 8/2017 | Burgers |
| 2018/0205125 A1 | 7/2018 | Bergers |
| 2018/0252479 A1 | 9/2018 | Kenney |
| 2018/0337434 A1 | 11/2018 | Burgers |
| 2019/0109357 A1 | 4/2019 | Kenney |
| 2019/0366876 A1 | 12/2019 | Cheadle |
| 2020/0136205 A1 | 4/2020 | Graves |
| 2020/0243934 A1 | 7/2020 | Galvis |
| 2021/0226512 A1 | 7/2021 | Broomfield |
| 2021/0242516 A1 | 8/2021 | Rahim |
| 2021/0247145 A1 | 8/2021 | Vakilimoghaddam |
| 2021/0254895 A1 | 8/2021 | Vakilimoghaddam |
| 2022/0120518 A1 | 4/2022 | Vanderwees |
| 2022/0336883 A1 | 10/2022 | Galvis |
| 2022/0393526 A1* | 12/2022 | Jelinewski ............. H02K 9/193 |
| 2024/0022130 A1* | 1/2024 | Lettich ................... H02K 9/197 |

* cited by examiner

*Primary Examiner* — Tulsidas C Patel
*Assistant Examiner* — Robert E Mates
(74) *Attorney, Agent, or Firm* — BAKERHOSTETLER

(57) ABSTRACT

Aspects of the subject disclosure relate to an electric motor that includes a stator. The stator includes a stator body having stator coils. The stator also includes a first substrate coupled to a first end of the stator body and configured to receive a fluid via a first manifold. The stator also includes a second substrate coupled to a second end of the stator body and configured to receive the fluid via a second manifold. The first substrate includes entry slots that form respective axial channels with exit slots of the second substrate to distribute the fluid across the stator body in a first direction. The second substrate includes entry slots that form respective axial channels with exit slots of the first substrate to distribute the fluid across the stator body in a second direction different from the first direction. Accordingly, the temperature of the electric motor can be regulated.

20 Claims, 7 Drawing Sheets

ALTERNATE STATOR SLOTS USING COMMON MANIFOLD INTERFACE FOR BIDIRECTIONAL STATOR COOLING

INTRODUCTION

The present disclosure relates generally to the automotive, manufacturing, and industrial equipment fields. More particularly, the present disclosure relates to alternate stator core slots using a common manifold interface bidirectional stator cooling and temperature regulation of electric motor.

SUMMARY

The present description relates generally to an electric motor that includes a stator and a rotor. The stator includes a stator body comprising a plurality of stator coil slots and a plurality of stator coils disposed respectively within the plurality of stator coil slots. The stator also includes a first substrate coupled to a first end of the stator body and configured to receive a fluid via a first manifold and distribute the fluid through a first cavity formed between the first substrate and the stator body. The stator also includes a second substrate coupled to a second end of the stator body and configured to receive the fluid via a second manifold and distribute the fluid through a second cavity formed between the second substrate and the stator body. The first substrate includes a first plurality of entry slots and a first plurality of exit slots at a radially inner side of the first substrate facing a rotor. The second substrate includes a second plurality of entry slots and a second plurality of exit slots at a radially inner side of the second substrate facing the rotor. Each of the first plurality of entry slots forms a first channel that extends longitudinally across the stator body to a respective one of the second plurality of exit slots for distributing the fluid through the first channel in a first direction. Each of the second plurality of entry slots forms a second channel that extends longitudinally across the stator body to a respective one of the first plurality of exit slots for distributing the fluid from the second manifold through the second channel in a second direction different from the first direction. Accordingly, this bidirectional fluid flow through the stator core allows the temperature of the electric motor to be regulated.

In accordance with one or more aspects of the disclosure, a stator includes a stator body that includes a plurality of stator coil slots and a plurality of stator coils disposed respectively within the plurality of stator coil slots. The stator also includes a first substrate coupled to a first end of the stator body and configured to receive a fluid via a first manifold and distribute the fluid through a first cavity formed between the first substrate and the stator body, wherein the first substrate includes a first plurality of entry slots and a first plurality of exit slots at a radially inner side of the first substrate facing a rotor. The stator also includes a second substrate coupled to a second end of the stator body and configured to receive the fluid via a second manifold and distribute the fluid through a second cavity formed between the second substrate and the stator body, wherein the second substrate includes a second plurality of entry slots and a second plurality of exit slots at a radially inner side of the second substrate facing the rotor. Each of the first plurality of entry slots forms a first channel that extends longitudinally across the stator body to a respective one of the second plurality of exit slots for distributing the fluid through the first channel in a first direction. Each of the second plurality of entry slots forms a second channel that extends longitudinally across the stator body to a respective one of the first plurality of exit slots for distributing the fluid from the second manifold through the second channel in a second direction different from the first direction.

In accordance with one or more aspects of the disclosure, a vehicle includes a drive unit comprising a stator and a rotor. The stator includes a stator body comprising a plurality of stator coil slots and a plurality of stator coils disposed respectively within the plurality of stator coil slots. The stator also includes a first substrate coupled to a first end of the stator body and configured to receive a fluid via a first manifold and distribute the fluid through a first cavity formed between the first substrate and the stator body, wherein the first substrate includes a first plurality of entry slots and a first plurality of exit slots at a radially inner side of the first substrate facing the rotor. The stator also includes a second substrate coupled to a second end of the stator body and configured to receive the fluid via a second manifold and distribute the fluid through a second cavity formed between the second substrate and the stator body, wherein the second substrate includes a second plurality of entry slots and a second plurality of exit slots at a radially inner side of the second substrate facing the rotor. Each of the first plurality of entry slots forms a first channel that extends longitudinally across the stator body to a respective one of the second plurality of exit slots for distributing the fluid through the first channel in a first direction. Each of the second plurality of entry slots forms a second channel that extends longitudinally across the stator body to a respective one of the first plurality of exit slots for distributing the fluid from the second manifold through the second channel in a second direction different from the first direction.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
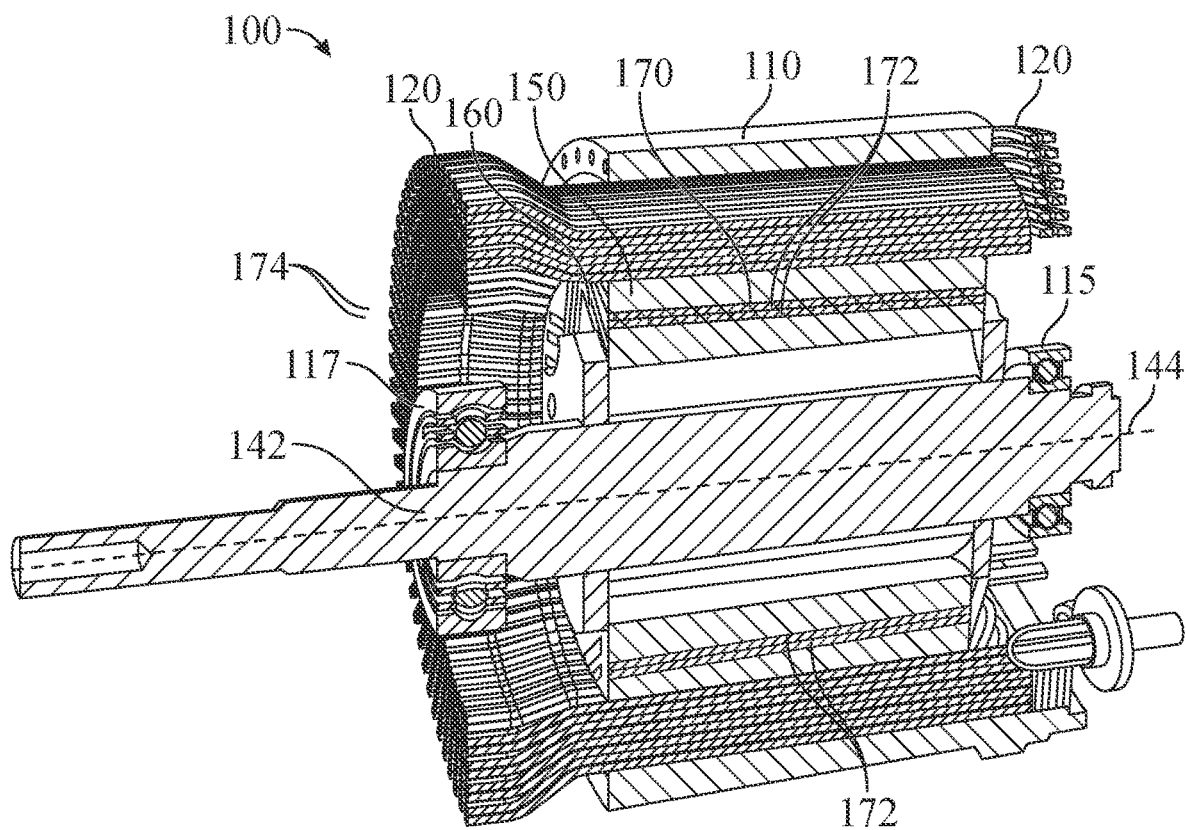
FIG. 1 illustrates a perspective sectional view of an example electric motor in accordance with one or more implementations of the subject technology.

The detailed description set forth below is intended as a description of various configurations of the subject technology and is not intended to represent the only configurations in which the subject technology can be practiced. The appended drawings are incorporated herein and constitute a part of the detailed description. An Appendix is also attached with which one or more implementations of the subject technology may be implemented. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Electric machines, including motors and generators, play a role in various applications. Fundamental to their design and operation are numerous types of losses, each of which can significantly impact their performance. These losses encompass thermal losses, resistive losses occurring within the winding conductors, as well as hysteresis, eddy current, and excess losses within the motor core, among others.

The quantification of losses is central to the understanding and evaluation of electric machines. This quantification is commonly expressed through the efficiency rating, which measures the ability of an electric machine to convert electric power into mechanical power. Efficiency is typically calculated using the formula: efficiency=output power/input power, or equivalently, as 1 minus the ratio of losses to input power. These losses manifest in various forms, including the dissipation of energy in the form of heat, sound, vibration, and other undesirable effects.

Heat or thermal losses within an electric machine represent a particularly significant aspect of these losses. They have a compounding effect, contributing to increased resistances within the system and consequently escalating the rate of loss. Moreover, electric machines are constructed using materials that operate within specific temperature thresholds to prevent damage. Exceeding these thresholds can lead to adverse consequences, such as magnet derating or reductions in the electrical strength of stator winding enamel.

Various techniques have been developed to mitigate heat losses within electric machines. Examples include the implementation of water jackets that utilize conduction and convection to extract heat directly from the stator core. Additionally, direct cooling methods employ convection-based mechanisms, such as oil sprays, to dissipate heat from the stator core and windings.

The stator core, often referred to as the "stack," constitutes a substantial collection of laminated electrical steel and serves as a reservoir of thermal energy within the electric machine. Effective and direct cooling of the stator core offers the potential to significantly reduce the thermal energy retained within the electric machine, thus enhancing its overall performance and reliability. As used herein, portions of the stator core formed of electrical steel may be referred to generally as the "stator core steel."

The present description relates generally to a stator core in an electric motor is a component that consists of laminated iron cores and copper windings. The coils of the stator can be operated to generate a rotational magnetic field. When the electric motor operates, it generates heat due to the electrical resistance of the windings and the core losses associated with magnetic flux changes. If the temperature of the stator core rises too high and isn't regulated effectively, several issues can arise that adversely impact the lifespan and/or performance of the electric motor. Accordingly, the temperature of the electric motor can be regulated by distributing a fluid through channels formed through and around the stator core as needed.

The present disclosure provides for addressing efficient cooling within an electric motor's stator core. In one or more implementations, the stator core includes axial channels for directing cooling fluid through a manifold, enabling direct cooling of the stator core steel and copper windings. In one or more implementations, the axial channels include a channel geometry in the slots themselves to cool copper conductors and core material directly. The channel configuration of these axial channels facilitates effective cooling and balances magnetic flux paths. Adjustable channel geometry features offer flexibility for specific cooling needs. The stator core also includes a sealed manifold that introduces cooling fluid into these channels, also facilitating end turn cooling. The axial channel configuration and geometry facilitate even temperature distribution and efficient flow management for optimal thermal benefits without excessive power requirements.

The subject technology uses a bidirectional flow concept of oil using a manifold interface with entry slots and exit slots. The manifold can include a common interface feature such that each of the stator ends includes a common interface with entry and exit slots that allow the cooling fluid to be directed in opposite directions between the two manifolds across the stator axial length. This bidirectional flow of the cooling fluid can amplify the impact of active slot cooling, resulting in highly efficient heat extraction methodology.

The subject technology can achieve several advantages over conventional approaches in stator cooling, such as achieving higher efficiency and higher rate of heat extraction by way of the underlying physics of oil flow in opposite directions via alternate stator slots, achieving symmetrical heat dissipation between adjacent slots by considering the entry fluid temperature being consistent on either ends of the stator, and achieving a balanced temperature and/or thermal equilibrium across the length of the stator core and circumference of the stator.

In certain embodiments, the motor described herein can include features of a synchronous electric motor. However, it will be understood that one or more features of the present disclosure can apply to one of a variety of motor types, including induction motors (IMs), synchronous electric motors, externally excited synchronous motors (EESMs), permanent magnet synchronous electric motors (PMSMs), line start synchronous motors (LSSMs), line start permanent magnet motors (LSPMMs), and the like.

Referring to FIG. 1, a motor can include a stator and a rotor for providing rotational output at a shaft. FIG. 1 is a partial perspective view of a motor 100 having a stator 110 and a rotor 150.

In one or more implementations, as shown in FIG. 1, a motor 100 can include a generally cylindrical rotor shaft 142 concentrically surrounded by a cylindrical rotor 150. As used herein, "cylindrical" and "annular" refer to structures having a generally circular internal cross-sectional shape, and likely a roughly circular external cross-sectional shape, although this external cross-sectional shape may vary to some degree, having flat or irregular regions. The rotor shaft 142 and rotor 150 are configured to rotate concentrically about a common central axis 144 in unison, potentially at high revolutions-per-minute (RPM). The rotor 150 can be manufactured from electric steel. The rotor shaft 142 can be manufactured from steel and/or other possible metal or metal alloy.

The motor 100 can include a stator 110 comprising stator coils 120 configured to generate a rotating magnetic field.

The rotating magnetic field can be generated by running multiple-phase currents through the stator coils 120. The stator coils 120 can form segments of its windings distributed about the rotor 150. For example, as shown in FIG. 1, the stator coils 120 can form segments that each extend in a direction that is generally parallel to the central axis 144 of the rotor 150. In one or more implementations, the stator coils 120 and/or segments thereof can be referred to as conductors. The rotating magnetic field generated by the stator 110 can rotate about the central axis 144 of the rotor 150. Neither the stator 110 nor the stator coils 120 need to move to generate the rotating magnetic field. For example, the coils can be operated with an alternating current with different segments thereof having a different direction and/or magnitude of current at any given moment. As the current direction and/or magnitude changes for each segment of the stator coils 120 over time, the magnetic field generated in the vicinity thereof can correspondingly change. Accordingly, the resulting magnetic field can be characterized as a standing magnetic field (e.g., with alternating magnetic field directions extending circumferentially about the central axis 144) that rotates about the central axis 144. The rotating magnetic field can further extend through the rotor 150, which can include permanent magnets 160 and rotor coils 170. The rotating magnetic field generated by the stator 110 can magnetically interact with such components of the rotor 150 to cause the rotor 150 to rotate about the central axis 144.

End windings of the stator coils 120 (e.g., crown end windings and/or weld end windings) of the stator 110 can be of a conductive material such as copper or another suitable metal or material. The end windings of the stator coils 120 may protrude axially beyond the rotor 150 and/or concentrically surround the rotor 150. The end windings of the stator coils 120 are connected to each other in parallel and/or in series to form a set of winding with multiple-phase terminals, which are operably connected to a controller, such as a processing unit of an electronic system, described further herein.

The rotor shaft 142 and/or the rotor 150 can be rotated with a first bearing assembly 115 disposed at the first end of the rotor shaft 142 and a second bearing assembly 117 disposed at the second end of the rotor shaft 142. As such, the rotor 150 and/or the rotor shaft 142 can be rotated about the central axis 144 as it responds to the rotating magnetic field generated by the stator 110. The rotor shaft 142 can accordingly provide torque output. Such output can be detected, for example by a sensor of an electronic system, described further herein.

The rotor coils 170 can form winding segments 172 of its windings that extend within the rotor 150. For example, as shown in FIG. 1, the rotor coils 170 can form winding segments 172 that each extend in a direction that is generally parallel to the central axis 144 of the rotor 150. Additionally or alternatively, winding segments 172 can extend longitudinally in a direction that is generally parallel to the segments of the stator coils 120. Each winding segments 172 can extend to or toward one or both of longitudinally terminal ends of the rotor 150. For example, a given winding segment 172 can extend longitudinally within a body of the rotor 150 and connect to another winding segment 172 on a circumferentially adjacent pole of the rotor 150. As such, the winding segments 172 can form windings that extend both parallel to the central axis 144 and across the central axis 144 to form one or more loops. One or more end windings 174 can be provided at one or more ends of the rotor 150. Each of the end windings 174 of the of the rotor coils 170 can be operably connected to a controller, such as a processing unit of an electronic system, described further herein. In one or more implementations, the end windings 174 can be connected to a power source through one or more brushes (not shown), such that the rotor 150 and the rotor coils 170 can rotate while the power source and/or control circuitry provides power (e.g., electric current) without rotating. Such brushes can further provide a generally consistent current to the rotor coils 170, such that the resulting temporary magnetic field can be maintained as needed during rotation of the rotor 150. Accordingly, the end windings 174 can be connected (e.g., with brushes) in a manner that facilitates rotation and a direct current (DC) through the rotor coils 170.

While FIG. 1 shows a portion of the motor 100, it will be understood that the portion shown can be a portion of a pattern that repeats circumferentially about a central axis to form continuous cylindrical structures. The pattern can repeat with any number of cycles, such that the illustrated example is not limited to the arrangement shown.

Figure 2:
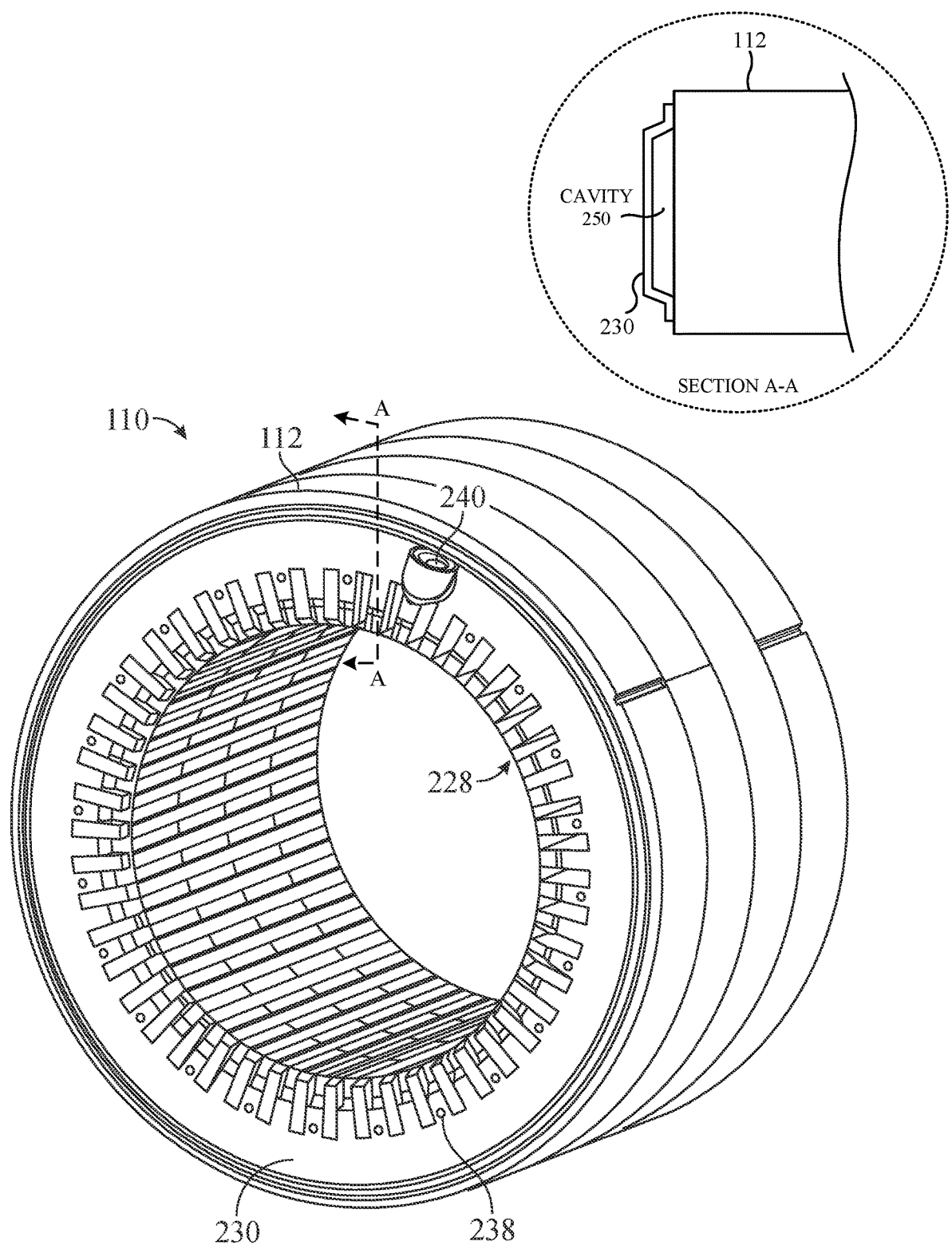
FIG. 2 illustrates a perspective view of an example stator in accordance with one or more implementations of the subject technology.

FIG. 2 illustrates a perspective view of an example stator in accordance with one or more implementations of the subject technology. In FIG. 2, the stator 110 includes the stator body 112 (also referred to herein as the "core"). The composition of the stator body 112 may consist of several thin steel layers, which are obtained from a coil and processed through a progressive dic. This manufacturing process can involve stamping out various features, including slots, outer diameters (OD), inner diameters (ID), and similar characteristics. In one or more implementations, the innovation centers on the design of dies capable of incorporating an additional feature atop the slot, which can be stamped directly onto the steel sheets. In one or more implementations, various shapes and sizes of steel sheets are employed in this manufacturing process.

While the steel sheets are typically a quarter of a millimeter thick, the entire core can measure around 125 millimeters as an example. This core assembly includes approximately 500 sheets of steel, but the core assembly can include an arbitrary number of sheets of metal depending on implementation. In one or more implementations, the core bonding methods encompass diverse techniques. For example, the bonding process may encompass gluing or welding, among other methods. In one or more implementations, the subject technology is not limited to a specific type of core bonding; it is adaptable to any existing core bonding technique.

In one or more implementations, the stator 110 includes a substrate 230 on one end of the stator body 112. In one or more other implementations, the substrate 230 is arranged on both ends of the stator body 112. The substrate 230 is a component that can be created through injection molding, utilizing materials such as nylon, PPS, or similar materials. Once molded, the substrate 230 may be subsequently coupled to specific surfaces within the stator body 112. For example, the substrate 330 may be epoxy bonded to the stator body 112. In other examples, the substrate 330 may be coupled in place to the stator body 112 by way of a clamping method (e.g., using a fastener, pinching the substrate 330 between wires and the stator body 112, pinching the substrate 330 between the stator body 112 and motor housing, etc.). In one or more other implementations, the substrate 230 can be formed of a metal or include a metallic material. In one or more other implementations, the substrate 230 can be formed as an integral part of the stator body 112. For example, a number of steel laminate sheets with particular cross sections can be stacked together to form the substrate 230. In one or more implementations, the substrate 230 may have a circular internal cross-sectional shape and a circular external cross-sectional shape that approximately aligns to the outer side surface of the stator body 112. In one or more other implementations, the stator 110 includes a substrate 230 on both opposite ends of the stator body 112. In one or more implementations, the substrate 230 includes slot openings 228 at a radially inner side of the substrate 230 facing a rotor (not shown).

In one or more implementations, axial channels are incorporated into the stator body 112, facilitating the routing of cooling fluid through the stator body 112 via a manifold 240. For example, the location of the axial channel may be configured to allow cooling fluid to remove heat from both the conductors as well as the stator body (e.g., core, core tooth, core steel) of the stator body 112 via direct contact with those components. In one or more implementations, the inlet of the manifold 240 may have a radial configuration. In one or more other implementations, the inlet of the manifold 240 may have an axial configuration. As illustrated in FIG. 2, the manifold 240 has a radially configured inlet. As illustrated in FIG. 2, the substrate 230 includes a deformed section on the back surface of the substrate 230 such that the substrate 230 can form an internal cavity (e.g., cavity 250) between the back surface of the substrate 230 and the outer side surface of the stator body 112 when the substrate 230 is coupled to the stator body 112. This configuration allows for the direct cooling of both the stator core steel and the copper windings located within the stator coils 120 (FIG. 1).

In one or more implementations, the size of the stator body 112 can be minimized to optimize the electromagnetic design. This approach involves reducing steel content, thereby creating more space for flux pathways. Although this reduction in size of the stator body 112 can affect the overall system's torque output, efficient heat dissipation is increased. In this regard, the heat removal surpasses the heat generation, resulting in an overall enhancement of performance.

The distribution of thermal energy and the management of peak temperatures within the electric motor are governed by the distribution of fluid flow through the axial channels of the stator 110 core. This configuration can promote substantially even temperature gradients within the motor 100 (FIG. 1) and assists in controlling the magnitude and locations of hot spots. Moreover, the cooling architecture of the motor 100 can accommodate requisite fluid flow without imposing penalties on the lubrication and cooling system restrictions.

In one or more other implementations, the substrate 230 includes orifices 238 through which cooling fluid emerges and contacts the exterior surfaces of the stator coils 120. The orifice 238 may serve as output holes such that fluid may egress through the orifice 238 by a process primarily driven by pressure. The cooling fluid may be directed to spray onto the windings of the stator coils 120, facilitating the cooling process at one end, and while the cooling fluid may be directed to cool the windings on the other end. In one or more other implementations, the above cooling process for both ends occurs along the same flow path.

The orifice 238 may include a specific geometry that allows them to protrude slightly from the front surface of the substrate 230. The orifices 238 can be sized according to desired parameters, including frequency and flow rate. To control the rate of cooling, adjustments can be made using a pump. Increasing the pump's RPM augments the flow rate, consequently elevating the pressure, which allows for varying cooling rates. However, cooling may be limited to a specific temperature range.

In one or more implementations, the orifices 238 may be arranged radially around the inner side of the substrate 230 and may be located in between the slot openings 228. The substrate 230 may include an arbitrary number of orifices 238 and the number of orifices 238 may vary depending on implementation that suit specific cooling requirements without departing from the scope of the present disclosure. In one or more implementations, the substrate 230 includes the orifices 238 between consecutive slot openings 228. In one or more other implementations, the substrate 230 includes the orifices 238 between non-consecutive slot openings 228. The portion of the stator body 112 at the radially inner side of the stator body 112 located between consecutive slot openings 228 can be referred to as a core tooth of the stator body 112.

Figure 3A:
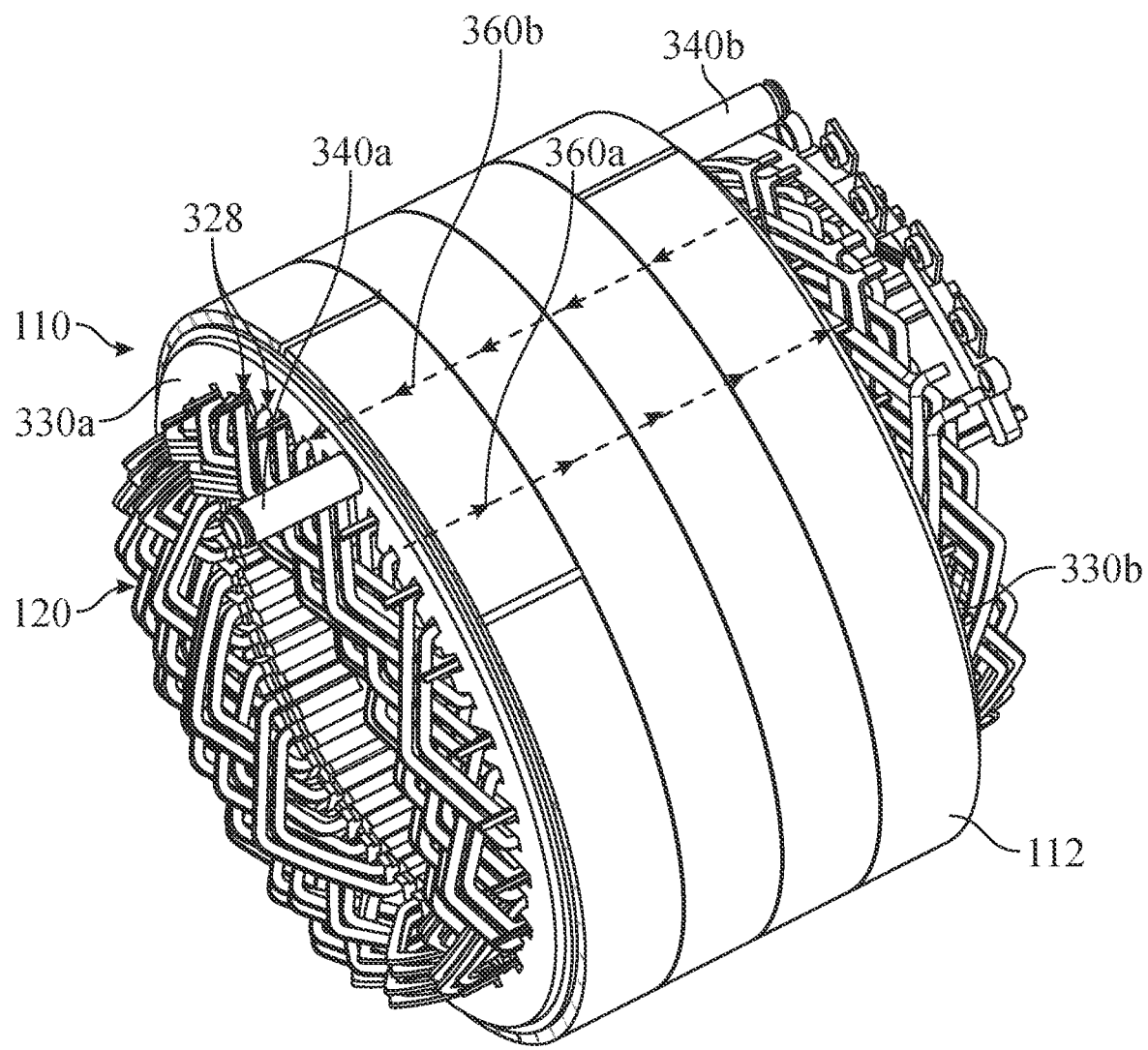
FIG. 3A illustrates a perspective view of an example electric motor with a common manifold interface in accordance with one or more implementations of the subject technology.

FIG. 3A illustrates a perspective view of an example electric motor with a common manifold interface in accordance with one or more implementations of the subject technology. In one or more implementations, as shown in FIG. 3A, a stator 110 can include a stator body 112 and stator coils 120. The stator coils 120 and/or segments thereof can be positioned within stator coil slots formed within the stator body 112. The stator coil slots can form slot openings 328 at a radially inner side of the stator body 112 facing a rotor (as illustrated in FIG. 1). The slot openings 328 can direct the magnetic fields generated by the stator coils 120 to be directed towards a rotor (not shown). The magnetic fields can be shaped, at least in part, by the geometry of the stator body 112. As used herein, the term "stator coil slots" may also be referred to as a stator coil slot.

As described herein, the stator coils 120 can be operated to generate a rotating magnetic field. For example, the stator coils 120 can be operated with alternating current with different segments thereof having a different direction and/or magnitude of current at any given moment. As the current direction and/or magnitude changes for each segment of the stator coils 120 over time, the magnetic field generated in the vicinity thereof can correspondingly change. The rotating magnetic field generated by the stator 110 can magnetically interact with such components of the rotor to cause the rotor to rotate. The stator coils 120 of the stator 110 can be operated to generate a rotating magnetic field. For example, the stator coils 120 can be operated with variable current with different segments thereof having a different direction and/or magnitude of current at any given moment. As the current direction and/or magnitude changes for each segment of the stator coils 120 over time, the magnetic field generated in the vicinity thereof can correspondingly change.

In one or more implementations, the motor 100 may be characterized as a three-phase alternating current (AC) motor, resulting in an inherent emergence of eddy currents and stator core losses. These phenomena induce heat generation during motor operation under ordinary circumstances. Consequently, the stator 110 core and windings in the stator coils 120 can invariably experience a temperature rise due to the current flow. Effective cooling of these windings and the stator 110 core assumes paramount significance in the quest for reducing resistance and enhancing overall efficiency, as elevated resistance leads to heightened losses and the risk of motor damage, including enamel degradation on the wires or laminations peeling apart from overheating.

The central issue here revolves around the generation of heat within the motor 100, necessitating the adoption of suitable cooling measures. In one or more implementations, the motor 100 is bolted to a housing. In one or more other implementations, the motor 100 is shrink-fitted into a housing. The shrink-fitting configuration may involve heating the housing, placing the stack (e.g., the stator body 112) within, and allowing the housing to cool, thereby encapsulating the stator 110 core within the housing. This shrink-fitting configuration can rely on friction to secure the position of the stator 110 and prevent rotation. In one or more other implementations, this shrink-fitting configuration may include limited space for accommodating the installation of spray bars and other active cooling mechanisms employed in electric motor designs.

In one or more implementations, the stator 110 core can be cooled around its outer diameter. In other drive units, oil is caused to flow through a bar positioned above the stator 110. Subsequently, a spray is directed downward towards the end windings and, at times, the stator body 112. This enables the provision of an air cavity above, where items may be accommodated. In one or more implementations, through the application of heat shrinking, this cooling technique may be performed using cutouts in the outer diameter.

The subject technology provides for an enhanced stator structure that directly addresses the fundamental sources of heat generation in the stator 110 core, effectively regulating the temperature of the motor 100. As will be discussed with reference to FIG. 3A, cooling of the motor 100 can be performed through the stator body 112 itself for sustaining an optimal temperature in the motor 100. For example, a manifold-like structure is introduced to the stator 110 core with the underlying objective to target the primary sources of heat within the stator 110. The bulk of the heat may emanate from the bottom portion of the conductors, which may be devoid of steel or convenient cooling pathways. To address this, a stator coil slot is incorporated, enabling the directed flow of fluid to closely interact with the windings of the stator coils 120. This approach efficiently tackles the heat generated within the stator 110 core due to flux pathways created by the stator coil 120 windings and simultaneously cools the wires, which incur resistive losses because of the current passing through them.

In one or more implementations, the stator 110 includes axial channels (e.g., 360a, 360b) for directing cooling fluid through one or more manifolds, enabling direct cooling of the stator core steel and copper windings of the stator coils 120. In one or more implementations, the axial channels 360a, 360b include a channel geometry in the slot openings 328 themselves to cool copper conductors and core material directly. The channel configuration of these axial channels facilitates effective cooling and balances magnetic flux paths. Adjustable channel geometry features offer flexibility for specific cooling needs. The stator 110 also includes one or more sealed manifolds that introduces cooling fluid into these channels, and may also facilitate end turn cooling. The axial channel configuration and geometry facilitate even temperature distribution and efficient flow management for optimal thermal benefits without excessive power requirements.

The stator 110 as illustrated in FIG. 3A uses a bidirectional flow concept of fluid using a manifold interface with entry slots and exit slots. The manifold can include a common interface feature such that each of the stator ends includes a common interface with entry and exit slots that allow the cooling fluid to be directed in opposite directions between the two manifolds across the stator axial length. For example, the stator 110 includes a first substrate 330a at a first end of the stator 110 and a second substrate 330b at a second end of the stator 110 that is on an opposite end from the first substrate 330a. The first substrate 330a and the second substrate 330b share a common manifold interface. For example, the first substrate 330a includes a first manifold 340a and the second substrate 330b includes a second manifold 340b. Each of the first manifold 340a and the second manifold 340b can receive a fluid and facilitate distribution of the received fluid within sealed cavities of the first substrate 330a and the second substrate 330b and bidirectional flow across the length of the axial channels 360a, 360b formed between the first substrate 330a and the second substrate 330b. For example, the axial channel 360a (not visible) is represented with a dashed line and forms a flow path from the first substrate 330a to the second substrate 330b. In another example, the axial channel 360b (not visible) is represented with a dashed line and forms a flow path from the second substrate 330b to the first substrate 330a. This bidirectional flow of the cooling fluid can amplify the impact of active slot cooling, resulting in highly efficient heat extraction methodology. In one or more implementations, each of the first substrate 330a and the second substrate 330b may be similar to the substrate 230 of FIG. 2. As illustrated in FIG. 3A, each of the first manifold 340a and the second manifold 340b has an axially configured inlet. In one or more other implementations, each of the first manifold 340a and the second manifold 340b can have a radially configured inlet.

Figure 3B:
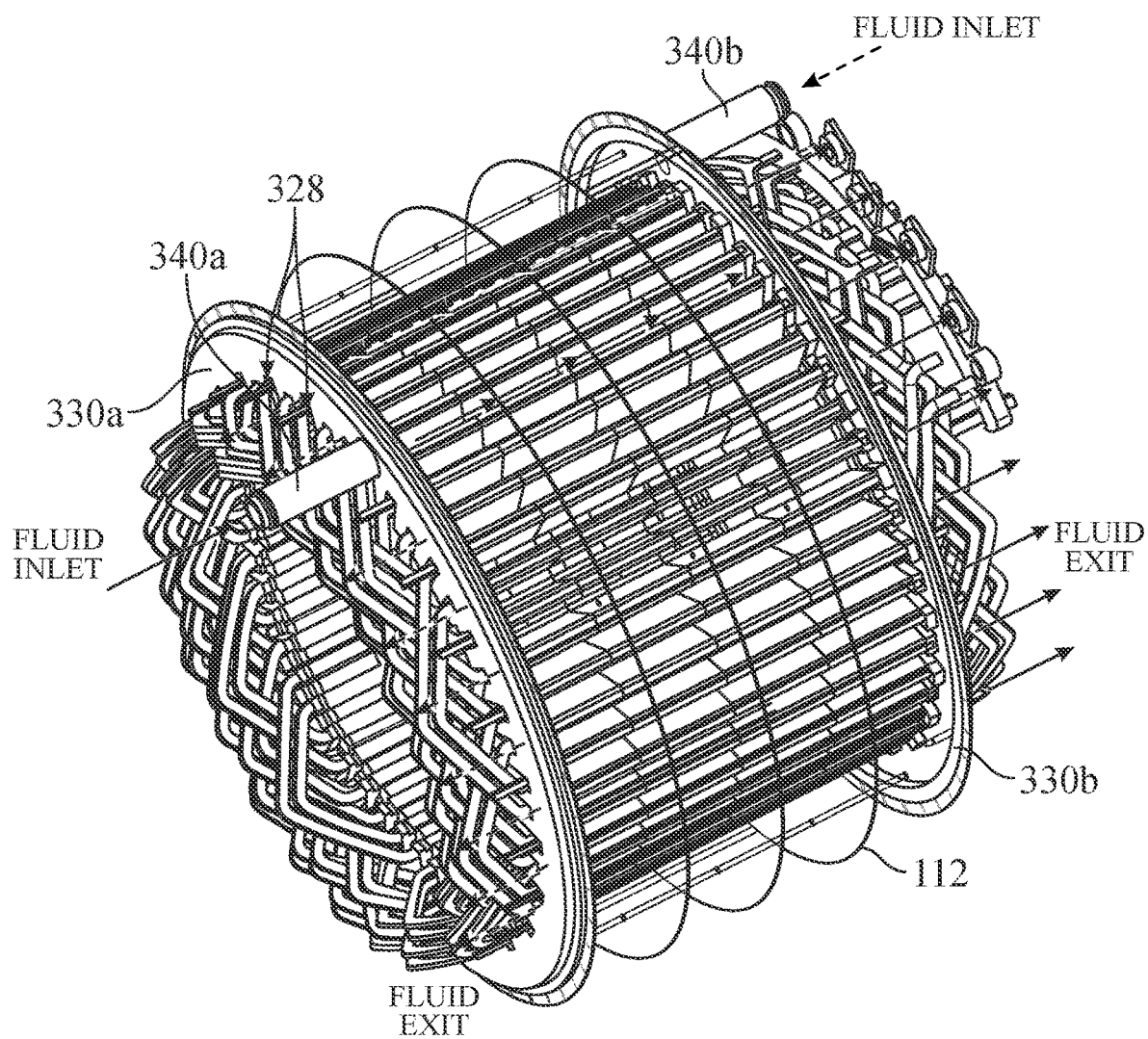
FIG. 3B illustrates a perspective view of an example electric motor with bidirectional stator cooling in accordance with one or more implementations of the subject technology.

FIG. 3B illustrates a perspective view of an example electric motor with bidirectional stator cooling in accordance with one or more implementations of the subject technology. For ease of illustration and explanation in comparison to FIG. 3A, the stator body 112 is illustrated transparently (or hidden) and the stator coils 120 are greyed out. To introduce a fluid or oil into the axial channels formed along the longitudinal axis of the slot openings 328 for bidirectional stator cooling, the first substrate 330a includes a sealed manifold at a non-busbar side of the stator 110 (e.g., the first manifold 340a), directing fluid from the non-busbar side and feeding it into the axial channels adjacent the slot openings 328 for temperature regulation of the stator body 112 and the motor 100 by distributing the fluid across the length of the axial channels from the first substrate 330a to the second substrate 330b as illustrated by the solid arrows. The first substrate 330a can distribute the fluid through a first cavity (e.g., cavity 250 of FIG. 2) formed between the first substrate 330a and the stator body 112. The fluid traveling from the first substrate 330a towards the second substrate 330b exits through slots of the second substrate 330b at the busbar side. Similarly, the second substrate 330b includes a sealed manifold at a busbar side of the stator 110 (e.g., the second manifold 340b), directing fluid from the busbar side and feeding it into the axial channels adjacent the slot openings 328 for temperature regulation of the stator body 112 and the motor 100 by distributing the fluid across the length of the axial channels from the second substrate 330a to the first substrate 330b as illustrated by the dashed arrows. The second substrate 330b can distribute the fluid through a second cavity (e.g., cavity 250 of FIG. 2) formed between the second substrate 330b and the stator body 112. The fluid traveling from the second substrate 330b towards the first substrate 330a exits through slots of the first substrate 330a at the non-busbar side.

Figure 4:
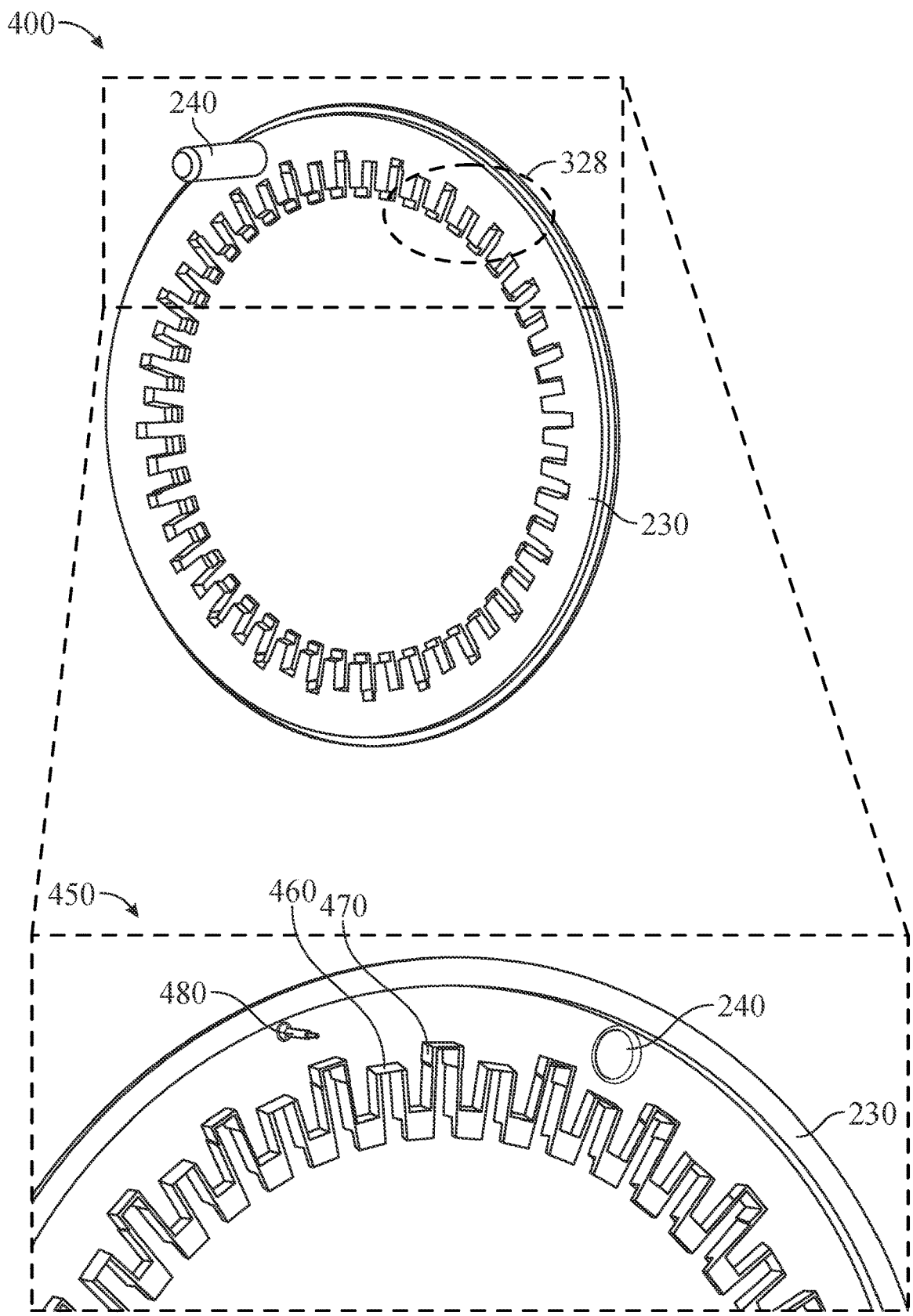
FIG. 4 illustrates perspective views of an example stator substrate panel in accordance with one or more implementations of the subject technology.

FIG. 4 illustrates perspective views of an example stator substrate panel in accordance with one or more implementations of the subject technology. The stator substrate panel (e.g., substrate 400) is illustrated in a front-facing perspective view. As also illustrated in FIG. 4, a view 450 of the substrate 400 illustrates a back-facing perspective view of a portion of the substrate 400 for ease of illustration and explanation. The substrate 400 may be similar to the substrate 230 of FIG. 2, the first substrate 330*a* and the second substrate 330*b*. In one or more implementations, the substrate 400 includes slot openings 328 at a radially inner side of the stator body 112 facing a rotor (e.g., the rotor 150 of FIG. 1). In one or more implementations, each of these slot openings 328 may include a same channel geometry. In one or more other implementations, each of these slot openings 328 may include a different channel geometry. This structural configuration permits the distribution (e.g., pumping) of cooling fluid or oil through the stator body 112, providing a direct cooling mechanism that effectively addresses major heat sources, including the copper conductors and the core material itself.

In one or more implementations, the slot openings 328 may further include slot openings with different channel geometries. For example, the slot openings 328 includes a first slot opening 460 having a first height and a second slot opening 470 having a second height that is greater than the first height. In one or more implementations, the substrate 400 includes multiple first slot openings 460 having the first height and multiple second slot openings 470 having the second height. In one or more implementations, the first slot openings 460 may be interleaved between the second slot openings 470 such that slots having the same height dimension are arranged in alternating order.

As described with reference to FIGS. 3A and 3B, the stator 110 uses a bidirectional flow concept of fluid using a manifold interface with entry slots and exit slots. In this regard, the first slot opening 460 having the first height can be implemented as the entry slot and the second slot opening 470 having the second height can be implemented as the exit slot. In operation, fluid entering an inlet of a manifold (e.g., 340*a*, 340*b*) would be distributed within a sealed cavity formed between the substrate (e.g., 330*a*, 330*b*) and the stator body 112 and flow into an axial channel via the entry slot (e.g., the first slot opening 460 having the first height) and flow across the length of the axial channel formed between the opposing substrates (e.g., 330*a* and 330*b*) such that the fluid exits via the exit slot (e.g., the second slot opening 470 having the second height). In this regard, the first slot opening 460 has a smaller height than the second slot opening 470 to retain the fluid within the axial channel once the fluid enters the axial channel, whereas the second slot opening 470 has a greater height than the first slot opening 460 to allow the fluid within the axial channel to exit once the fluid reaches the end of the axial channel.

The substrate 400 includes an input port of the manifold 240 on the front surface of the substrate 400 (as illustrated in the front-facing perspective view of the substrate 400) for ingress of a cooling fluid and an output port of the manifold 240 on the back surface of the substrate 400 for egress of the cooling fluid (as illustrated in the back-facing perspective view of the substrate 400) to distribute the cooling fluid through the axial channels of the stator body 112. The substrate 400 includes a deformed section on the back surface of the substrate 400 such that the substrate 400 can form an internal cavity between the back surface of the substrate 400 and the outer side surface of the stator body 112 when the substrate 400 is fastened to the stator body 112. In this regard, the substrate 400 facilitates the controlled extraction and transfer of the cooling fluid from metal to predetermined locations. This capability facilitates the directed routing of the cooling fluid through designated channels, subsequently guiding its passage through the axial channels of the stator body 112.

In one or more other implementations, the substrate 400 includes alignment pins 480 that protrude outward from the back surface of the substrate 400 and are arranged at designated locations on the back surface of the substrate 400 (as illustrated in the back-facing perspective view of the substrate 400). The alignment pins 480 may be molded features that can be created through injection molding using similar materials as the substrate 400. The alignment pins 480 can be used to locate the substrate 400 on the outer side surface of the stator body 112 as illustrated in FIGS. 2, 3A and 3B and ensure retention of the substrate 400.

Figure 5:
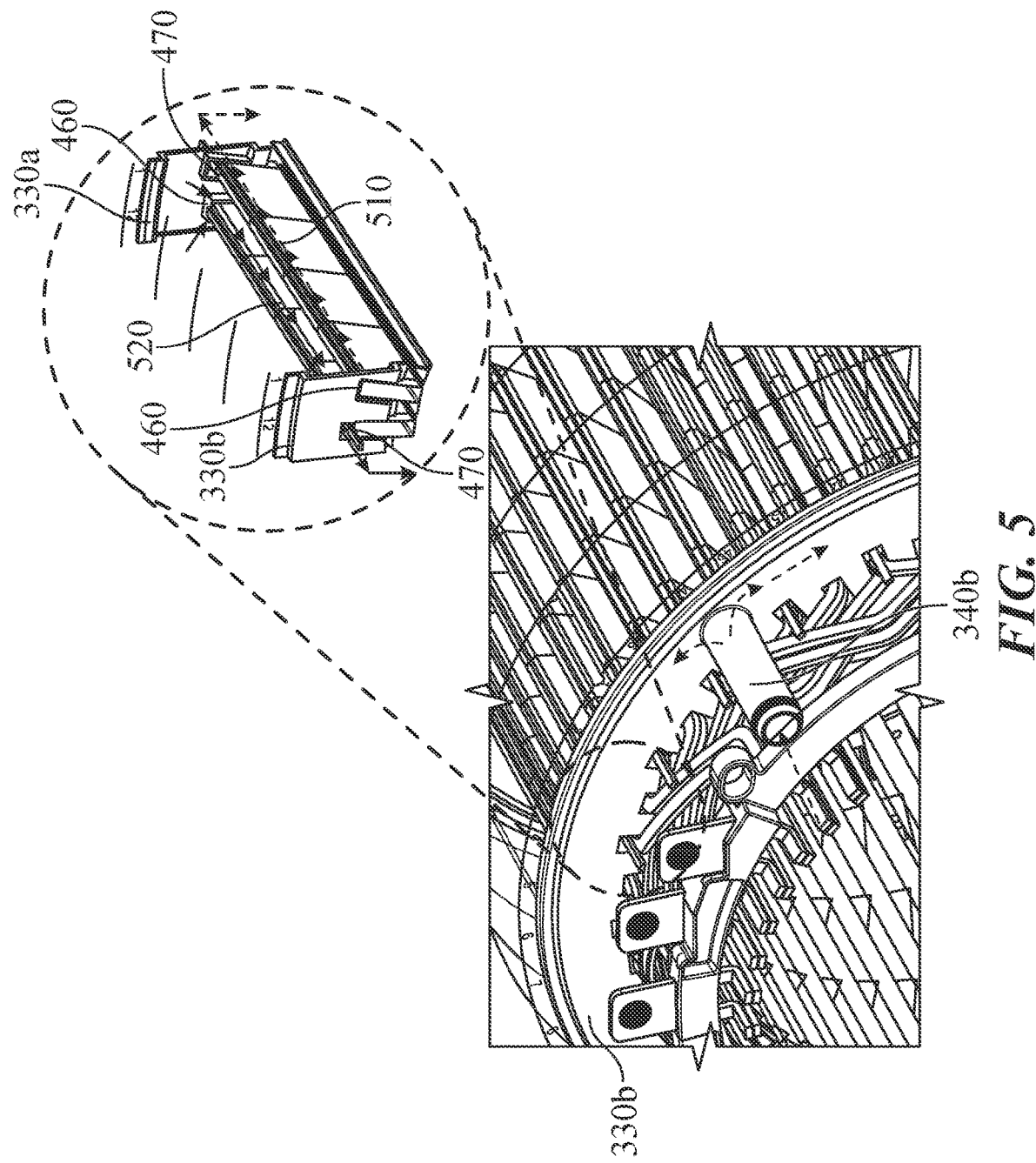
FIG. 5 illustrates a perspective sectional view of a portion of the stator of FIG. 3B in accordance with one or more implementations of the subject technology.

FIG. 5 illustrates a perspective sectional view of a portion of the stator of FIG. 3B in accordance with one or more implementations of the subject technology. As described with reference to FIGS. 3A and 3B, the stator 110 uses a bidirectional flow concept of fluid using a manifold interface with entry slots and exit slots at both ends of the stator 110. As conceptually illustrated in FIG. 5, a fluid (e.g., a cooling fluid or an oil) enters the manifold 340*b* from a source. The second substrate 330*b* and at least a portion of the outer surface of the stator body 112 are separated, creating a cavity (e.g., cavity 250 of FIG. 2) inside where the fluid is internally distributed around an annulus formed by the cavity. The flow of the fluid occurs within this annulus, which is effectively sealed around the radial edges of the second substrate 330*b*, thus directing the fluid downward and routed around the annulus, as illustrated by the dashed arrowed lines. The size of the annulus can be adjusted to accommodate specific flow rates and pressure requirements.

The second substrate 330*b* includes a continuous pathway within the cavity of the second substrate 330*b*. In this regard, the fluid enters at one end of the second substrate 330*b* via the manifold 340*b*, traverses a pathway (e.g., labyrinthine pathway) within the cavity of the second substrate 330*b*, and exits the second substrate 330*b* via the entry slots to traverse the axial channels to the other end of the stator body 112 and exit via the exit slots of the first substrate 330*a*. The fluid can enter the axial channels to directly cool the stacked steel sheets of the stator body 112 and windings of the stator coils 120. For example, the fluid distributed around the annulus can exit the second substrate 330*b* through the entry slots (e.g., the first slot openings 460 having the second height) to enter the axial channel and cool the stator body 112 along a flow path 510. In this regard, the entry slots have access to the cavity of the second substrate 330*b*. The fluid distributed across the axial channel along the flow path 510 can exit the first substrate 330*a* through the exit slots (e.g., the second slot openings 470 having the second height) to cool the end turns of the stator coils 120. In this regard, the exit slots are restricted access to the cavity of the second substrate 330*b*, preventing the fluid from flowing back into the cavity and directing the fluid to exit the axial channel at the other end of the stator body 112. To provide a comprehensive understanding of the configuration, the windings of the stator coils 120 are present within this context. These windings are separated by a barrier from the cooling fluid and the stator coils 120. This barrier can be positioned as closely as possible to facilitate the cooling of the windings. The fluid is likely to be warmer upon egress, resulting in reduced cooling efficiency. However, the subject technology directs the fluid outward, effectively utilizing any remaining heat capacity to absorb heat from the heat sources located within the stator body 112. Although discussion of the entry and exit slots was made with reference to the second substrate 330*b*, the structure and operation of the entry slots and exit slots also applies with respect to the first substrate 330*a*.

As illustrated in FIGS. 3B and 5, each of the entry slots (e.g., the first slot openings 460) of the first substrate 330a is arranged between two exit slots (e.g., the second slot openings 470) of the first substrate 330a. Similarly, each of the entry slots (e.g., the first slot openings 460) of the second substrate 330b is arranged between two exit slots (e.g., the second slot openings 470) of the second substrate 330b. To facilitate the bidirectional fluid flow between the first substrate 330a and the second substrate 330b, the first substrate 330a is radially staggered by one slot relative to the second substrate 330b. For example, an entry slot of the first substrate 330a is staggered radially relative to the entry slot of the second substrate 330b. In this regard, the entry slot of the first substrate 330a forms an axial channel with the exit slot of the second substrate 330b for distributing the fluid in a first direction. Similarly, the entry slot of the second substrate 330b forms an axial channel with the exit slot of the first substrate 330a for distributing the fluid in a second direction (opposite to the first direction), resulting in the bidirectional fluid flow across these two axial channels.

In one or more implementations, the number of entry slots in a substrate may be the same as the number of exit slots in that same substrate. In one or more other implementations, the number of entry slots in a substrate may be different from the number of exit slots in that same substrate. In one or more other implementations, there can be an arbitrary number of combinations of entry slots and exit slots between the first substrate 330a and the second substrate 330b. For example, the first substrate 330a may include a first quantity of entry slots and the second substrate 330b may include a second quantity of exit slots that is different from the first quantity of entry slots in the first substrate 330a. In one example, the first quantity of entry slots in the first substrate 330a can be greater than the second quantity of exit slots in the second substrate 330b such that the number of flow paths from the entry slots in the first substrate 330a may converge to the smaller number of exit slots in the second substrate 330b. In another example, the first quantity of entry slots in the first substrate 330a can be smaller than the second quantity of exit slots in the second substrate 330b such that the number of flow paths from the entry slots in the first substrate 330a may fan out to a greater number of exit slots in the second substrate 330b. The same examples can apply to scenarios involving the entry slots in the second substrate 330b and the exit slots in the first substrate 330a.

Figure 6:
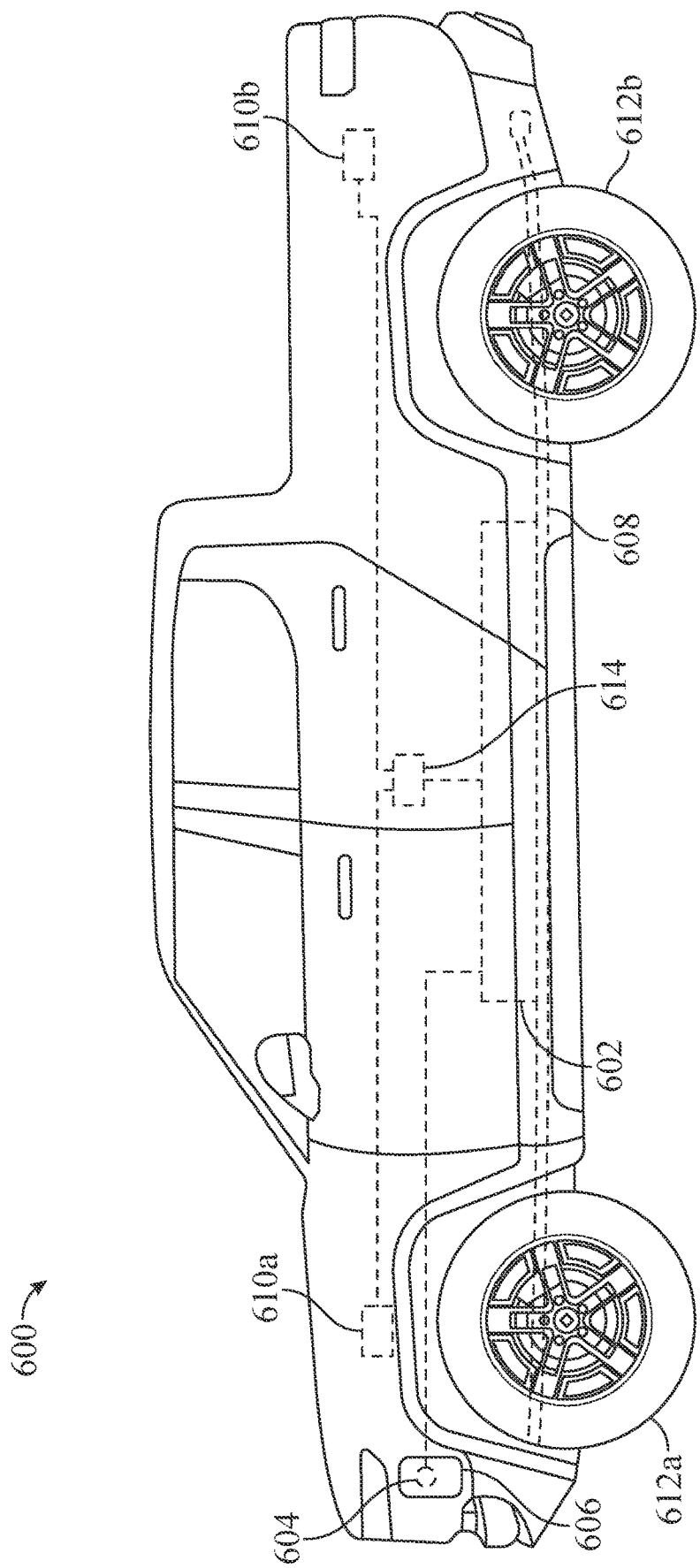
FIG. 6 illustrates an exemplary embodiment of a vehicle, in accordance with aspects of the present disclosure.

According to one or more implementations, for example as shown in FIG. 6, an example implementation of a movable apparatus takes the form of a vehicle 600. In one or more implementations, the vehicle 600 is a sport utility vehicle. In the embodiment shown in FIG. 6, the vehicle 600 is a truck. Generally, the vehicle 600 may take the form of any motorized vehicle, including motorized vehicles with an internal combustion engine and/or one or more electric motors. In this regard, other implementations of the vehicle 600 may include land-based vehicles, such as a car (e.g., sedan, hatchback), a van, a motorcycle, a motorized scooter, or a commercial truck, as non-limiting examples. Still further, other implementations of the vehicle 600 may include sea or air transport vehicles, planes, helicopters, submarines, boats, or drones, as non-limiting examples.

As shown, the vehicle 600 includes a battery pack 602. The battery pack 602 may be coupled (e.g., electrically coupled) to one or more electrical systems of the vehicle 600 to provide power to the one or more electrical systems. The battery pack 602 may include one or more battery modules (not shown in FIG. 6), with each of the one or more battery modules carrying several battery cells. In one or more implementations, the battery pack 602 does not include any battery modules and takes the form of a cell-to-pack configuration. Also, the battery cells of the battery pack 602 may include rechargeable battery cells, and accordingly, the battery pack 602 may be referred to as a rechargeable battery pack. In this regard, the vehicle 600 includes a port 604 (e.g., charge port) designed to receive a cable connector (not shown in FIG. 6) that provides power (e.g., AC power) that is converted to DC power to charge the battery pack 602. The port 604 can be accessed by moving a cover 606. The vehicle 600 may include a chassis 608 used to support the battery pack 602 and various other components (not shown in FIG. 6) of the vehicle 600, such as the suspension and differential, as non-limiting examples.

The battery pack 602 may couple to a drive unit 610a and a drive unit 610b. The drive units 610a and 610b may include, for example, a motor, an inverter, a gear box, and a differential. The drive unit 610a is generally located at the front of the vehicle 600, while the drive unit 610b is generally located at the back of the vehicle 600. Accordingly, the drive unit 610a and the drive unit 610b may be referred to as a front drive unit and a rear drive unit, respectively. While two drive units (e.g., drive units 610a and 610b) are shown, the vehicle 600 may include additional drive units. In one or more implementations, each of the drive units 610a and 610b is an internal combustion engine. In the embodiment shown in FIG. 6, each of the drive units 610a and 610b is an electric motor (e.g., the motor 100 of FIG. 1). In this regard, the drive unit 610a and the drive unit 610b can use energy (e.g., electrical energy) stored in the battery pack 602 for propulsion in order to drive (e.g., rotationally drive) a wheel 612a and a wheel 612b, respectively. The wheels 612a and 612b each represent an additional front wheel and rear wheel, respectively, of the vehicle 600. By driving the wheels 612a and 612b, the vehicle 600 can move in various directions. In one or more implementations, each of the drive units 610a and 610b include the motor 100 having the stator 110, including the bidirectional axial channels formed across the longitudinal length of the stator body 112 and between the opposing substrates having a common manifold interface for distributing the cooling fluid in and around the stator body 112 for temperature regulation of the motor 100.

Also, the vehicle 600 may further include a vehicle management system 614 designed to provide torque commands to the drive units 610a and 610b. The drive units 610a and 610b may operate in accordance with torque shaping logic provided by the vehicle management system 614. In this regard, the drive units 610a and 610b can generate, based on the torque shaping logic, a torque output provided to the wheels 612a and 612b, respectively, that dictate the speed at which the vehicle 600 is traveling.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the present disclosure. The word exemplary is used to mean serving as an example or illustration. To the extent that the term includes, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different orders. Some of the steps, operations, or processes may be performed simultaneously. The accompanying method claims, if any, present elements of the various steps, operations, or processes in a sample order, and are not meant to be limited to the specific order or hierarchy presented. These may be performed in serial, linearly, in parallel, or in different order. It should be understood that the described instructions, operations, and systems can generally be integrated together in a single software/hardware product or packaged into multiple software/hardware products.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims.

Moreover, nothing disclosed herein is intended to be dedicated to the public regardless of whether such disclosure is explicitly recited in the claims. No claim element is to be construed under the provisions of 35 U.S.C. § 112 (f), unless the element is expressly recited using the phrase "means for" or, in the case of a method claim, the element is recited using the phrase "step for."

Those of skill in the art would appreciate that the various illustrative blocks, modules, elements, components, methods, and algorithms described herein may be implemented as hardware, electronic hardware, computer software, or combinations thereof. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

The title, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A stator for an electric motor, the stator comprising:
   a stator body;
   a first substrate comprising a first plurality of entry slots having a height extending from a radially inner side of the first substrate facing a rotor and a first plurality of exit slots having a height extending from the radially inner side of the first substrate, the height of each of the first plurality of exit slots being greater than the height of each of the first plurality of entry slots; and
   a second substrate comprising a second plurality of entry slots having a height extending from a radially inner side of the second substrate facing the rotor and a second plurality of exit slots having a height extending from the radially inner side of the second substrate, the height of each of the second plurality of exit slots being greater than the height of each of the second plurality of entry slots,
   wherein each of the first plurality of entry slots forms a first channel that extends longitudinally across the stator body to a respective one of the second plurality of exit slots for distributing a fluid through the first channel in a first direction, and
    wherein each of the second plurality of entry slots forms a second channel that extends longitudinally across the stator body to a respective one of the first plurality of exit slots for distributing the fluid through the second channel in a second direction different from the first direction.

2. The stator of claim 1, wherein each of the first plurality of entry slots is arranged between two exit slots of the first plurality of exit slots, and wherein each of the second plurality of entry slots is arranged between two exit slots of the second plurality of exit slots.

3. The stator of claim 1, wherein the first substrate is radially staggered by one slot relative to the second substrate.

4. The stator of claim 1, wherein each of the first plurality of entry slots and each of the first plurality of exit slots align with a respective one of a plurality of stator coil slots of the stator body, and wherein each of the second plurality of entry slots and each of the second plurality of exit slots align with a respective one of the plurality of stator coil slots of the stator body.

5. The stator of claim 1, wherein each of the first plurality of entry slots has access to a first cavity formed between the first substrate and the stator body and each of the first plurality of exit slots is restricted access to the first cavity, and wherein each of the second plurality of entry slots has access to a second cavity formed between the second substrate and the stator body and each of the second plurality of exit slots is restricted access to the second cavity.

6. A motor comprising:
    a rotor; and
    a stator comprising:
        a stator body comprising a plurality of stator coil slots and a plurality of stator coils disposed respectively within the plurality of stator coil slots;
        a first substrate coupled to a first end of the stator body and configured to receive a fluid via a first manifold and distribute the fluid through a first cavity formed between the first substrate and the stator body, wherein the first substrate includes a first plurality of entry slots having a height extending from a radially inner side of the first substrate facing a rotor and a first plurality of exit slots having a height extending from the radially inner side of the first substrate, the height of each of the first plurality of exit slots being different than the height of each of the first plurality of entry slots; and
        a second substrate coupled to a second end of the stator body and configured to receive the fluid via a second manifold and distribute the fluid through a second cavity formed between the second substrate and the stator body, wherein the second substrate includes a second plurality of entry slots having a height extending from a radially inner side of the second substrate facing the rotor and a second plurality of exit slots having a height extending from the radially inner side of the second substrate, the height of each of the second plurality of exit slots being different than the height of each of the second plurality of entry slots,
        wherein each of the first plurality of entry slots forms a first channel that extends longitudinally across the stator body to a respective one of the second plurality of exit slots for distributing the fluid through the first channel in a first direction, and
        wherein each of the second plurality of entry slots forms a second channel that extends longitudinally across the stator body to a respective one of the first plurality of exit slots for distributing the fluid from the second manifold through the second channel in a second direction different from the first direction.

7. The motor of claim 6, wherein each of the first plurality of entry slots is arranged between two exit slots of the first plurality of exit slots, and wherein each of the second plurality of entry slots is arranged between two exit slots of the second plurality of exit slots.

8. The motor of claim 6, wherein the first substrate is radially staggered by one slot relative to the second substrate.

9. The motor of claim 6, wherein each of the first plurality of entry slots and each of the first plurality of exit slots align with a respective one of the plurality of stator coil slots of the stator, and wherein each of the second plurality of entry slots and each of the second plurality of exit slots align with a respective one of the plurality of stator coil slots of the stator body.

10. The motor of claim 6, wherein each of the first plurality of entry slots has access to the first cavity and each of the first plurality of exit slots is restricted access to the first cavity, and wherein each of the second plurality of entry slots has access to the second cavity and each of the second plurality of exit slots is restricted access to the second cavity.

11. A vehicle, comprising:
    a drive unit comprising a stator and a rotor,
    the stator comprising:
        a stator body comprising a plurality of stator coil slots and a plurality of stator coils disposed respectively within the plurality of stator coil slots;
        a first substrate coupled to a first end of the stator body and configured to receive a fluid via a first manifold and distribute the fluid through a first cavity formed between the first substrate and the stator body, wherein the first substrate includes a first plurality of entry slots having a height extending from a radially inner side of the first substrate facing the rotor and a first plurality of exit slots having a height extending from the radially inner side of the first substrate, the height of each of the first plurality of exit slots being different than the height of each of the first plurality of entry slots; and
        a second substrate coupled to a second end of the stator body and configured to receive the fluid via a second manifold and distribute the fluid through a second cavity formed between the second substrate and the stator body, wherein the second substrate includes a second plurality of entry slots having a height extending from a radially inner side of the second substrate facing the rotor and a second plurality of exit slots having a height extending from the radially inner side of the second substrate, the height of each of the second plurality of exit slots being different than the height of each of the second plurality of entry slots,
        wherein each of the first plurality of entry slots forms a first channel that extends longitudinally across the stator body to a respective one of the second plurality of exit slots for distributing the fluid through the first channel in a first direction, and
        wherein each of the second plurality of entry slots forms a second channel that extends longitudinally across the stator body to a respective one of the first plurality of exit slots for distributing the fluid from the second manifold through the second channel in a second direction different from the first direction.

12. The vehicle of claim 11, wherein each of the first plurality of entry slots is arranged between two exit slots of the first plurality of exit slots, and wherein each of the second plurality of entry slots is arranged between two exit slots of the second plurality of exit slots.

13. The vehicle of claim 11, wherein the first substrate is radially staggered by one slot relative to the second substrate.

14. The vehicle of claim 11, wherein each of the first plurality of entry slots and each of the first plurality of exit slots align with a respective one of the plurality of stator coil slots of the stator body, and wherein each of the second plurality of entry slots and each of the second plurality of exit slots align with a respective one of the plurality of stator coil slots of the stator body.

15. The vehicle of claim 11, wherein each of the first plurality of entry slots has access to the first cavity and each of the first plurality of exit slots is restricted access to the first cavity, and wherein each of the second plurality of entry slots has access to the second cavity and each of the second plurality of exit slots is restricted access to the second cavity.

16. An apparatus, comprising:
a stator body;
a first substrate; and
a second substrate,
wherein each of the first substrate and the second substrate includes a plurality of entry slots having a first height extending from a respective radially inner side of the first substrate and the second substrate and a plurality of exit slots having a second height extending from a respective radially inner side of the first substrate and the second substrate, the second height being different than the first height,
wherein each of the plurality of entry slots of the first substrate forms a first channel that extends longitudinally across the stator body to a respective one of the plurality of exit slots of the second substrate for distributing a fluid from at least one manifold through the first channel in a first direction, and
wherein each of the plurality of entry slots of the second substrate forms a second channel that extends longitudinally across the stator body to a respective one of the plurality of exit slots of the first substrate for distributing the fluid from the at least one manifold through the second channel in a second direction different from the first direction.

17. The apparatus of claim 16, wherein each of the plurality of entry slots of the first substrate is arranged between two exit slots of the plurality of exit slots of the first substrate, and wherein each of the plurality of entry slots of the second substrate is arranged between two exit slots of the plurality of exit slots of the second substrate.

18. The apparatus of claim 16, wherein the first substrate is radially staggered by one slot relative to the second substrate.

19. The apparatus of claim 16, wherein each of the plurality of entry slots of the first substrate and each of the plurality of exit slots of the first substrate align with a respective stator coil slot of the stator body, and wherein each of the plurality of entry slots of the second substrate and each of the plurality of exit slots of the second substrate align with a respective stator coil slot of the stator body.

20. The apparatus of claim 16, wherein each of the plurality of entry slots of the first substrate has access to a first cavity formed between the first substrate and the stator body and each of the plurality of exit slots of the first substrate is restricted access to the first cavity, and wherein each of the plurality of entry slots of the second substrate has access to a second cavity formed between the second substrate and the stator body and each of the plurality of exit slots of the second substrate is restricted access to the second cavity.

* * * * *